United States Patent
Falck et al.

(10) Patent No.: US 6,360,265 B1
(45) Date of Patent: Mar. 19, 2002

(54) ARRANGEMENT OF DELIVERING INTERNET PROTOCOL DATAGRAMS FOR MULTIMEDIA SERVICES TO THE SAME SERVER

(75) Inventors: Keith Franklin Falck, Naperville; Chinmei Chen Lee, Woodridge, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/112,170

(22) Filed: Jul. 8, 1998

(51) Int. Cl.[7] ............................................... G06F 13/00
(52) U.S. Cl. ...................... 709/227; 709/230; 370/466; 370/467
(58) Field of Search ................................ 709/227, 230; 370/466, 467

(56) References Cited

U.S. PATENT DOCUMENTS

| | | | | |
|---|---|---|---|---|
| 5,854,982 A | * | 12/1998 | Chambers et al. | 455/445 |
| 5,909,431 A | * | 6/1999 | Kuthyar et al. | 370/260 |
| 6,006,272 A | * | 12/1999 | Aravamudan et al. | 709/245 |
| 6,055,236 A | * | 4/2000 | Nessett et al. | 370/389 |
| 6,195,705 B1 | * | 2/2001 | Leung | 709/245 |
| 6,219,706 B1 | * | 4/2001 | Fan et al. | 709/225 |
| 6,226,676 B1 | * | 5/2001 | Crump et al. | 709/227 |

OTHER PUBLICATIONS

U.S. application No. 09/035,600, Borella et al., filed Mar. 5, 1998.*

"Multimedia Protocol Services System Arch . . . re Specification: Schematic Archtitecture," from Internet http://ihgpweb.ih.lucent.com/~scms/arch_docs/mmsp/schemat.htr, Jan. 27, 1998.

"The problems and pitfalls of getting H.323 safely through firewalls," Intel Corporation, H.323 and Firewalls, from the Internet address http://developer.intel.com/ial/H323/H323_WPR.HTM, Feb. 11, 1998.

"A Primer on the H.323 Series Standard," DataBeam Corporation dated Apr. 1, 1997.

"The IP Network Address Translator (NAT)," RFC 1631, Hosted by SunSITE *Denmark*, from Internet Address http://sunsite.auc.dk/RFC/rfc/rfc1631.html, Jul. 2, 1998.

"Address Allocation for Private Internets," RFC 1597, Obsoleted by 0000, 1918, Hosted by SunSITE *Denmark*, from Internet Address http://sunsite.auc.dk/RFC/rfc/rfc1597.html, Jul. 2, 1998.

"Address Allocation for Private Internets," RFC 1918, Hosted by SunSITE *Denmark*, from Internet Address http://sunsite.auc.dk/RFC/rfc/rfc1918.html, Jul. 2, 1998.

* cited by examiner

*Primary Examiner*—Kenneth R. Coulter

(57) ABSTRACT

A Network Address Translator (NAT) processes multi-media calls between an H.323 multi-media terminal and the same H.323 multi-media server of many H.323 multi-media servers. By using the values of the TCP and UDP ports uniquely identifying the H.323 server responsible for processing a multi-media call, the NAT can calculate the identity of the proper transmission path to the same H.323 multi-media server.

42 Claims, 6 Drawing Sheets

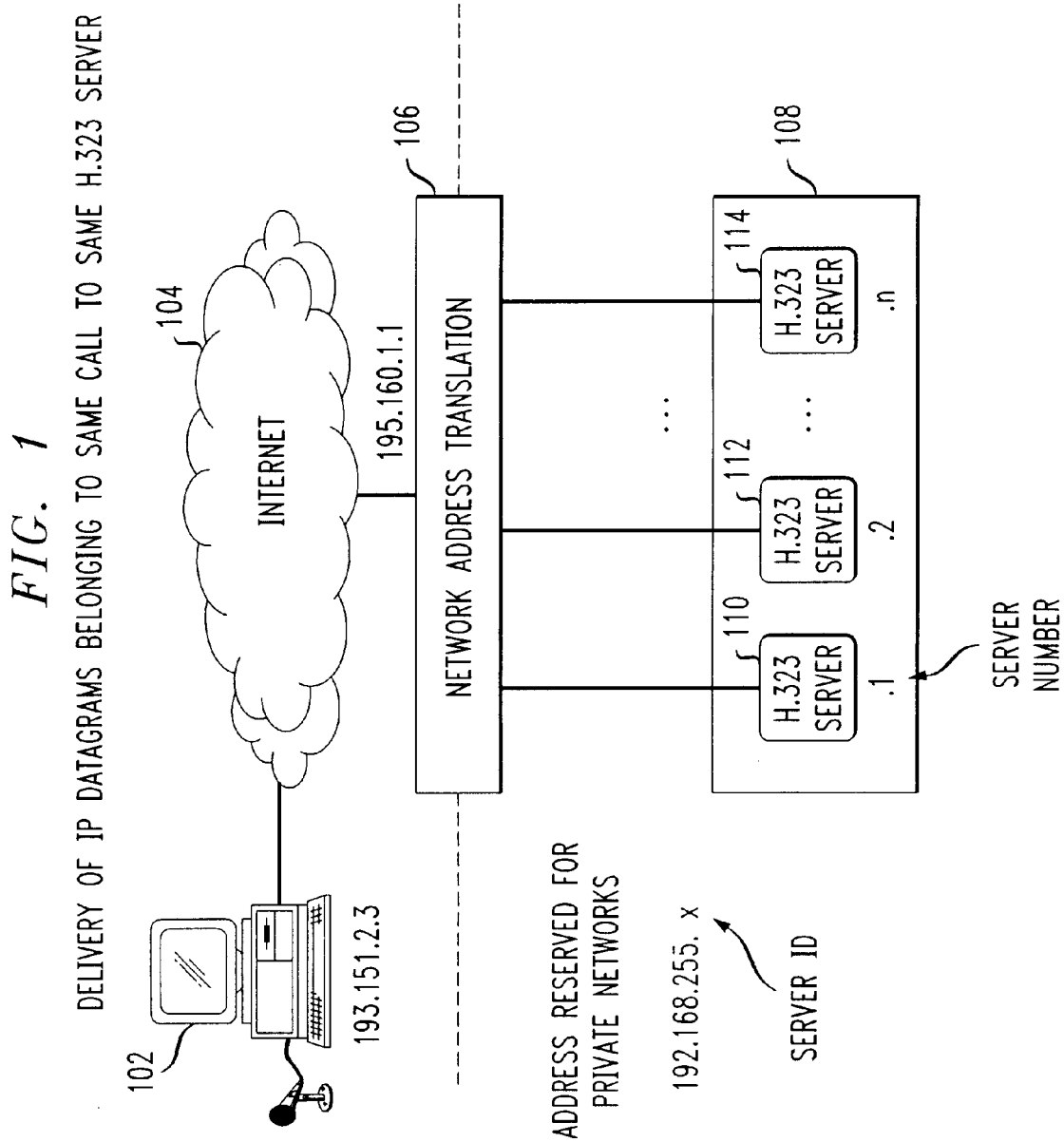

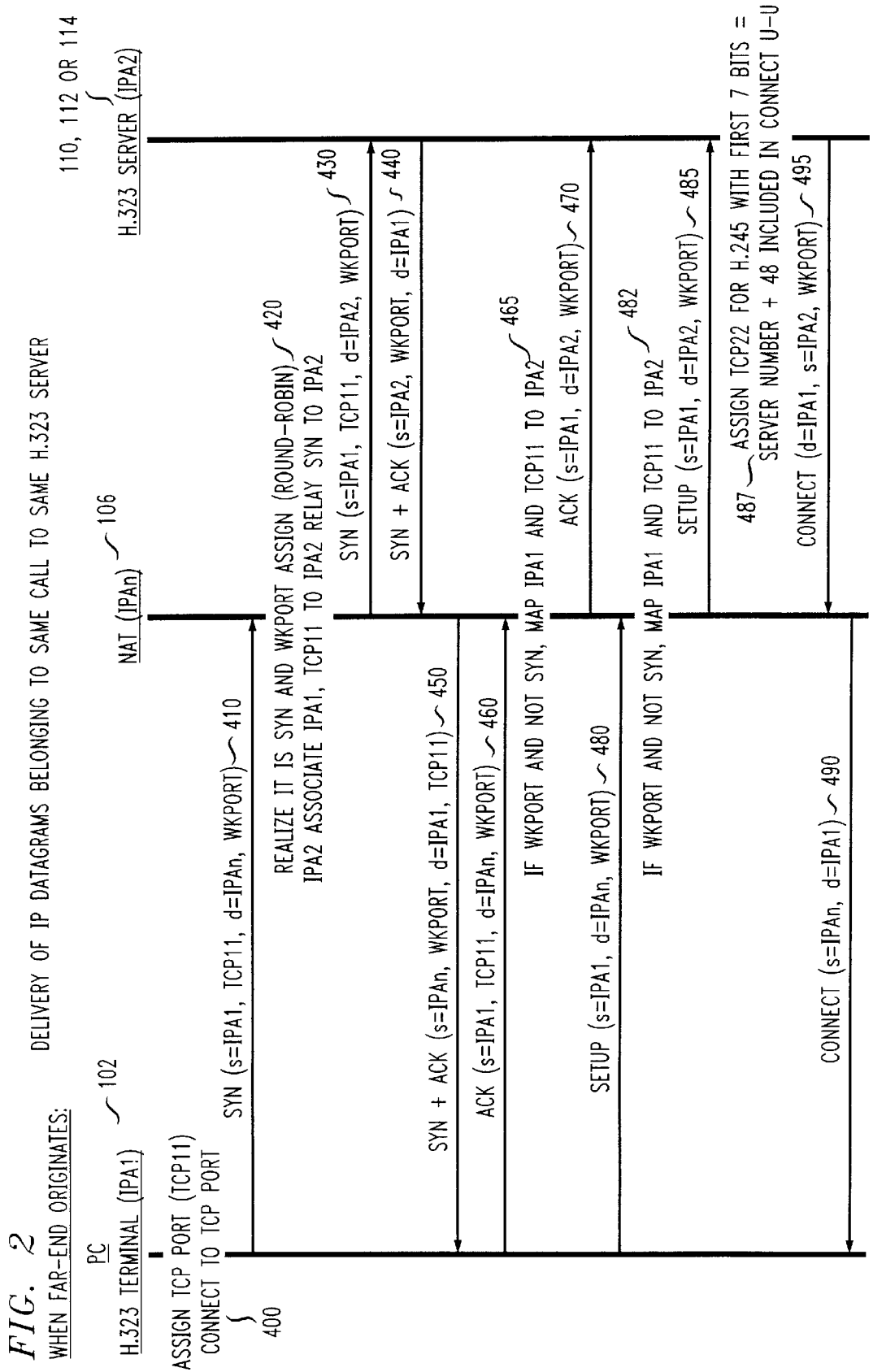

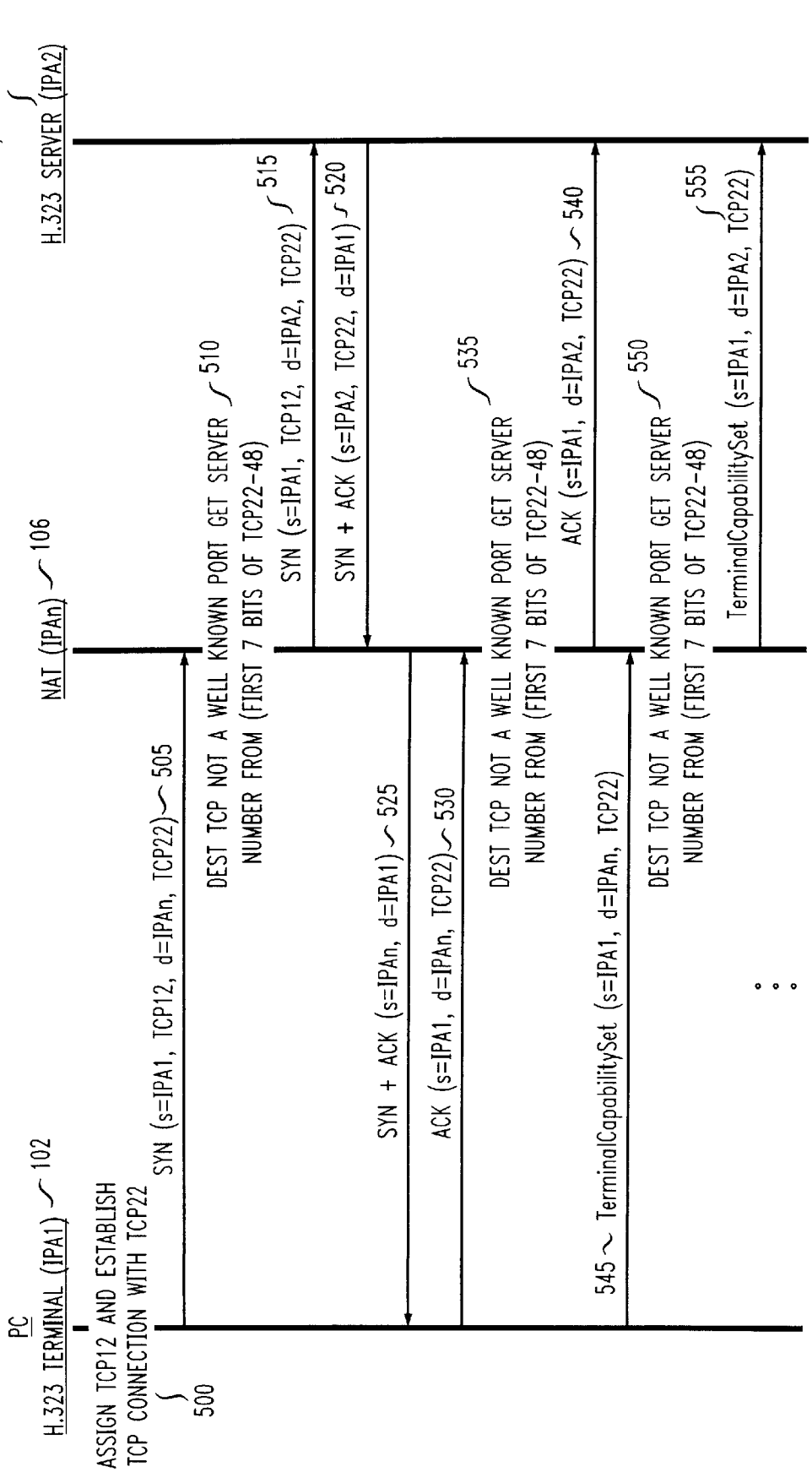

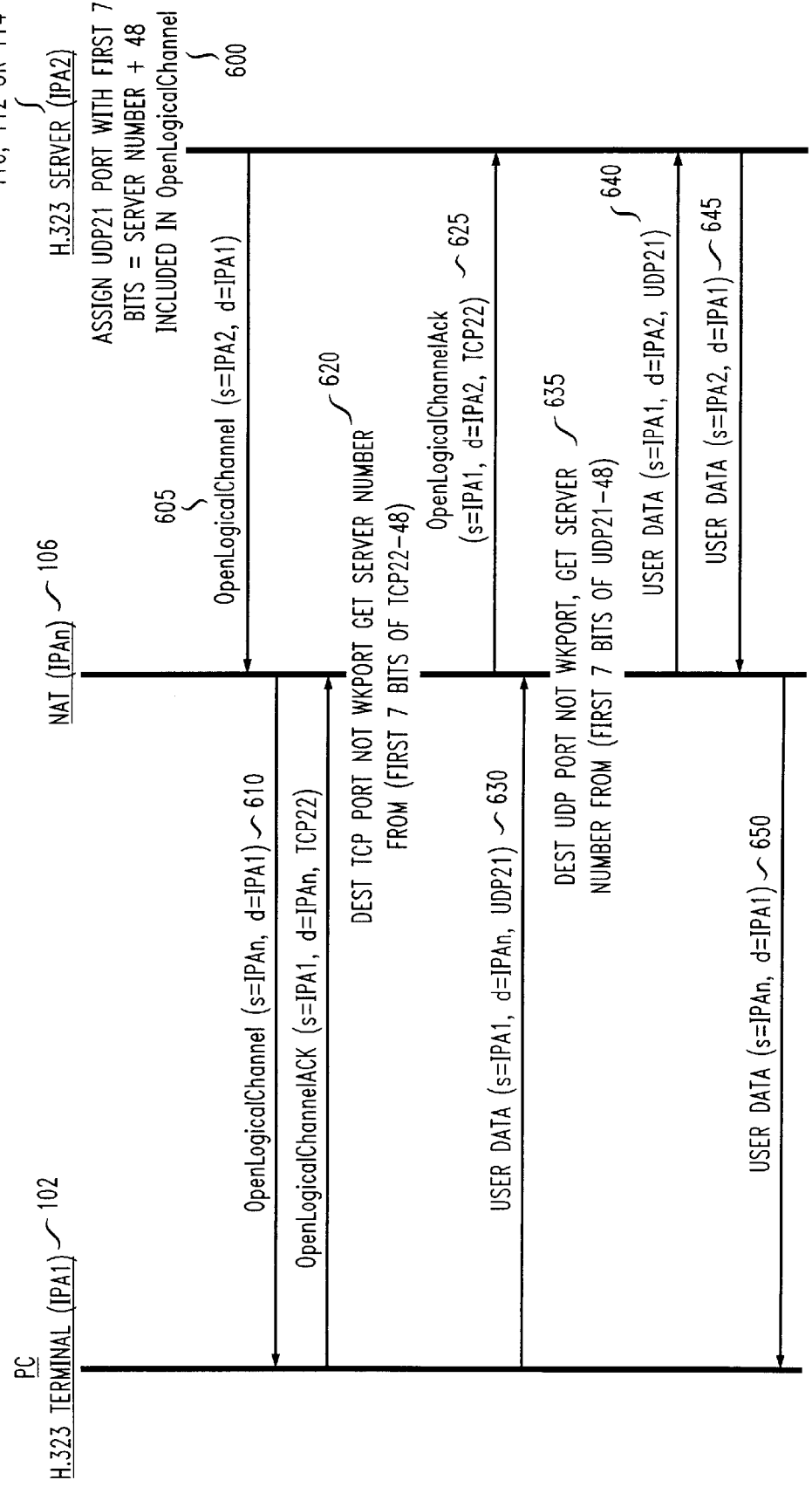

FIG. 5

DELIVERY OF IP DATAGRAMS BELONGING TO SAME CALL TO SAME H.323 SERVER

NAT TRANSLATION RULE:

ONLY NEEDED FOR INCOMING PACKETS FROM EXTERNAL NETWORK

| WKPORT | SYN | ACTION |
|---|---|---|
| YES | YES | DISTRIBUTE (DETERMINE DESTINATION IP ADDRESS) ASSOCIATE DESTINATION IP ADDRESS WITH SOURCE IP ADDRESS AND SOURCE PORT |
| YES | NO | TRANSLATE DESTINATION IP ADDRESS BASED ON SOURCE IP ADDRESS AND SOURCE PORT |
| NO | — | TRANSLATE DESTINATION IP ADDRESS BASED ON PORT RANGE OF DESTINATION PORT |

DELIEVERY OF IP DATAGRAMS BELONGING TO SAME CALL TO SAME H.323 SERVER

TCP/UDP PORT NAMING SCHEME

TCP/UDP PORT NUMBER: 16 BITS

US 6,360,265 B1

ARRANGEMENT OF DELIVERING INTERNET PROTOCOL DATAGRAMS FOR MULTIMEDIA SERVICES TO THE SAME SERVER

BACKGROUND OF THE INVENTION

1. Field of the Invention

This invention relates generally to communication between a network and multiple servers represented by a common Internet Protocol (IP) address. Specifically, this invention relates to the establishment of a multi-media connection for the delivery of IP datagrams belonging to the same multimedia call between an H.323 multi-media terminal and the same H.323 multimedia server.

2. Background of the Invention

The personal computer is rapidly becoming a key communication device for millions of users. This trend has accelerated with the increased use of the Internet. Computer communications have typically involved the exchange of electronic mail, however recent advancements have introduced voice and video connectivity. With the increased reliance upon such services, communications providers are in need of standard ways of providing connectivity while cost effectively managing the routing of the incoming multi-media traffic. In addition to providing such manageability, the H.323 real time multi-media communications standards provide for compatibility and any subsequent expansion.

The ITU-T (International Telecommunications Union) H.323 standard defines how a flexible, real-time, interactive set of multimedia communications can be exchanged on packet-based networks. This international standard is the first standard that was provided through the collective input of both traditional telephony communications experts and those from computer communications arena. In addition to fully-interactive media communications such as conferencing, H.323 also has provisions for other forms of communications, such as multimedia streaming. H.323 offers benefits to end-users, developers and service providers of Internet telephony and Internet multi-media applications. The H.323 standard itself provides new business opportunities for valueadded services such as call tracking, multimedia conferencing and multimedia collaboration.

A typical multi-media networking environment includes a proxy. A proxy allows contact between entities on one side, typically a public networking environment such as the Internet, and a second side, typically a private networking environment. The H.323 proxy typically sits on an enterprise firewall and monitors and processes all H.323 traffic that travels through the firewall. The proxy ensures that only valid H.323 traffic passes through the firewall.

A Network Address Translator (NAT) is an address proxy that performs a firewall function. The NAT can be thought of as an associating device that translates a source Internet Protocol (IP) address to its own external address and forwards the packet to a destination for a packet delivery external to the private network. For packet traffic incoming into a private network, the NAT translates the destination IP address to an internal address based on information in the packet header, such as the source IP address, source port number or the destination port number.

There is a substantial difference between an H.323 proxy and a NAT in terms of the required processing needs. A NAT performs the address translation based on physical interfaces, source/destination addresses, or ports depending on applications or administrative requirements. This information can be easily and quickly ascertained. As such, the NAT reduces the amount of processing resources necessary to process the call. In comparison, the use of an H.323 proxy requires the call to terminate at the firewall, sort through a substantial amount of user information to determine the call characteristics and then establish a new connection from the H.323 proxy to the server each time a new end-to-end H.323 call is to be established. Therefore, there is additional processing time required whenever the call passes through the H.323 proxy to the destination.

For the multimedia protocol services, the NAT can be placed in front of the group of multi-media servers in the data network for three purposes. First, the NAT is used for security purposes to protect the IP processors in the server from potential security attacks from external networks. For the NAT to perform address translations, it will generally examine incoming packets to determine the translation rule to use. If packet filtering is also part of the rule, the NAT also effectively serves as an access controller as well as its main function to hide the internal addresses from external networks. Second, the NAT shields the growth of internal IP processors from the external networks because the external networks are oblivious of the internal addresses. This simplifies the data that an external gateway finding directory server needs to keep, thus simplifying its administration. Third, the NAT is used to distribute multimedia IP traffic to the IP processors in the server bank.

In the TCP/IP world, applications use what are commonly referred to as "well-known ports" to communicate with each other. A well-known port specifies that a service should or must use a particular port, for example an HTTP server will listen on TCP port 80 by default. When a client application sends out a request to a well-known port for a particular application, the client application assumes that the corresponding server application is "listening" on the well known port associated with that application. For example, the well-known port number for multi-media applications is TCP port 1720. A server application will actively listen for incoming connection requests on TCP port 1720 for a client application requesting a multimedia service. Client applications connect to the well-known destination port to establish a TCP multi-media connection. For H.323 multi-media communications, subsequent TCP connections using dynamic port numbers may be made for further communication controls.

A particular TCP connection is defined by the port and address of both the originating endpoint (or its proxy) and the terminating endpoint (or its proxy). By its very nature, a TCP connection is an application to application connection. A TCP connection is established as an end-to-end medium or lower level transport for other H.323 protocols. All H.323 control protocols are encapsulated within TCP connections. To establish a multi-media transport requires at least three connections with different H.323 control and data transport features. First, a TCP connection is established to transfer H.225 protocol messages. Second, a TCP connection is established to transfer H.245 protocol messages. Third, an unreliable UDP connection is established for the transfer of real time sensitive data packets or another TCP connection is established to transfer data reliably.

It is an object of the present invention to allow a NAT to deliver IP datagrams, i.e. data packets, belonging to the same call to the same H.323 server. It is desirable to perform the IP datagram delivery without the use of a typical H.323 proxy, thereby reducing the resources necessary to process the call and allowing for a "one-to-many distribution." Instead of searching the many layers of user-to-user information, which is required by a typical H.323 proxy, the destination should be quickly and easily ascertainable. Additionally, it is desirable to provide a reusable block of TCP and UDP port numbers and internet protocol addresses associated with independent H.323 servers for processing the end point/terminal H.323 multi-media calls, coupled with a mechanism to randomly select an H.323 processor to process all transactions at the time a particular H.323 multi-media call request is made.

SUMMARY OF THE INVENTION

In accordance with one aspect of the invention, the foregoing object is achieved by providing a method and apparatus for establishing a multi-media call between an originating H.323 terminal and an H.323 server through an intermediate device. The H.323 terminal is typically connected to a public network, such as the Internet. The H.323 server is typically part of a private networking environment containing a number of H.323 servers. The intermediate device, a Network Address Translator (NAT), serves as a go-between and substitutes for an H.323 proxy.

In accordance with another aspect of the present invention, incoming multimedia traffic from the Internet is addressed to the globally unique IP address identifying the NAT, not the many addresses of the number of H.323 servers contained in the private network. The "one-to-many distribution" results from the directing of a multimedia call from the globally unique address identifying the NAT to any one of the many private network addresses identifying any one of the H.323 multi-media servers in the private network. When a call comes into the NAT requesting a multimedia service, the NAT determines the best available server to handle the incoming call based upon an algorithm at an intermediate device. The multi-media call will then be distributed from the "one," the NAT, to one of the "many" H.323 servers.

An aspect of the present invention currently not available with any available H.323 proxy device provides for the same server to be used for the duration of the data transmission after the initial assigning of the server to process the multi-media call. Prior to the step of assigning of a TCP or UDP port uniquely identifying the server, there is a unique cooperation between the NAT and the server for any transmission by a multimedia terminal represented by a port and IP address requesting a multi-media service on a well-known port. Once the request is presented to the NAT for multi-media service on a well-known port, the NAT determines the IP address of the H.323 server processing the call and this IP address is recorded at the NAT for future reference. The NAT associates the port and IP address of the source of the multimedia call with the IP address of the multi-media server handling the call. The NAT will then recognize that any incoming transmission from the particular port and IP address destined for the multi-media well-known port is mapped to the associated destination multi-media server.

In accordance with another aspect of the invention, the H.323 server assigns a TCP port or UDP port uniquely identifying the H.323 server. The identity of the TCP port or UDP port assigned by the H.323 server is transmitted to the originating H.323 terminal for the establishment of the next TCP or UDP connection. For any transmission from the H.323 terminal to the NAT with the designated destination as a particular TCP port or UDP port that is not a well-known port, the NAT performs a calculation using the value of the destination port number to determine the identity of the H.323 server responsible for the processing of the H.323 multimedia call. As such, the call will always use the same multi-media server allowing efficient use of resources and reducing the possibility of lost data. Additionally, the calculation process eliminates the typical H.323 proxy and therefore increases the speed of the transmission and lessens the strain on the processing resources. The calculation process eliminates the necessity to search the many layers of the user-to-user information in its entirety for the information to process the multi-media call. The destination multi-media server can be ascertained from the destination TCP or UDP port information.

By substituting a NAT containing the processing capabilities of the present invention for a typical H.323 proxy, a multimedia call originating from an H.323 multi-media terminal will be processed quickly and efficiently by the same H.323 server.

BRIEF DESCRIPTION OF THE DRAWINGS

Features of this invention will be understood best from the following detailed description taken in conjunction with the drawings:

FIG. 1 illustrates a typical network architecture of multiple H.323 servers connected to the Network Address Translator;

FIGS. 2, 3 and 4 illustrate flow diagrams describing the method of establishing and maintaining a multi-media connection between the originating H.323 multi-media terminal and the corresponding H.323 multi-media server;

FIG. 5 is a table illustrating the NAT translation rule for the three possible scenarios;

DETAILED DESCRIPTION OF THE PREFERRED EMBODIMENT

Figure 6:
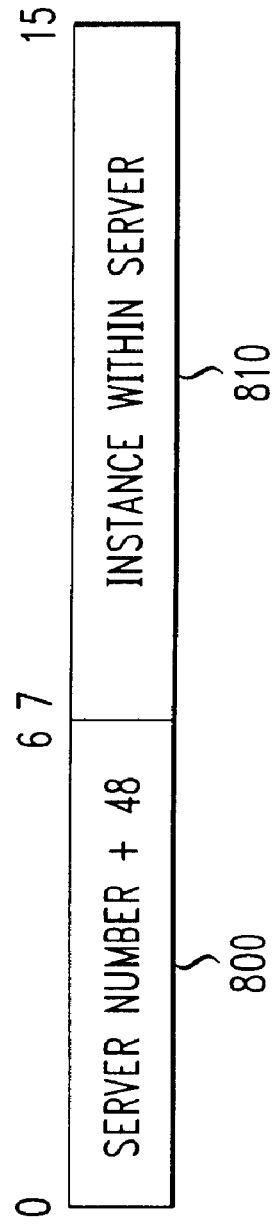
FIG. 6 illustrates the TCP port, 16 bits in length, divided into two segments.

FIG. 1 shows a data network (100) comprised of a first multi-media service terminal (102), an IP based network (104) which is typically the Internet, a Network Address Translator (NAT) (106) and a bank of servers (108). The bank of servers (108) contains a number of H.323 multi-media servers (110, 112 and 114). Any one of the multi-media servers (110, 112 and 114) can also be referred to as a multi-media gateway. Additionally, the term "peer" can be used to describe the first multimedia service terminal (102) and any one of the multimedia servers (110, 112 or 114) assigned to process the multimedia call. Only three such servers are shown within the bank of servers (108), but those skilled in the art will recognize that any number of servers could be used. In the preferred embodiment, server bank (108) contains a number of H.323 multi-media servers (110, 112 and 114), but server bank (108) could contain a number of 5ESS® Switches or web servers without departing from the intended scope of the invention.

FIG. 1 also illustrates the addressing at the first multi-media service client (102), the NAT (106) and the number of multi-media servers (110, 112 and 114) within the bank of servers (108). Addresses visible to the Internet (104) must be globally unique. As such, the NAT (106) uses globally unique Internet address for its presence on the Internet (104). Further, as shown in FIG. 1, addresses used by the servers are in a private network group and may be reused.

The multi-media service terminal (102) is represented by a globally unique address, and in the example shown the multi-media service terminal is represented by global address 193.151.2.3. The NAT (106) is also represented by a globally unique address, and in the figure has an address of 195.160.1.1. Each H.323 server (110, 112 and 114) within the bank of servers 108 is represented by an address in the private network address space, i.e. addresses within a private data network and in this case an address 192.168.255.x, where x corresponds to the server identifier of the particular H.323 server. The addressing described above is used to route the H.323 multi-media call initiating from multi-media service terminal (102) to one of the H.323 servers (110, 112 and 114).

FIG. 2 represents a flow diagram for establishing and maintaining a multimedia call between the originating H.323 multimedia terminal (102) represented by a first internet protocol address and the destination H.323 multi-media server (110, 112 or 114) represented by a second, different protocol address. Once an H.323 multimedia server is chosen to process a particular H.323 multi-media call, the same H.323 multi-media server is used for the duration of the call.

An H.323 multi-media call is comprised of three connections described in general terms below and in greater detail infra. The first connection is a first control Transmission Control Protocol (TCP) connection. The first TCP connection is used to exchange H.225 protocol messages. The communicating parties use the SETUP and CONNECT messages to establish the H.323 multi-media call. The second connection is a second control TCP connection. The second TCP connection is used to exchange H.245 protocol messages. H.245 protocol is used to negotiate call characteristics such as silent suppression, echo treatment and voice encoding between the originating H.323 multimedia terminal and the H.323 multi-media server. Also exchanged via H.245 are the UDP ports to be used in the third "connection." The third "connection" is either an unreliable UDP connection for the transfer of real time sensitive data packets or another TCP connection to transfer data reliably.

As shown in FIG. 2, when the originating H.323 multi-media terminal (102) initiates an H.323 multi-media call or a data transmission, a TCP port is assigned (400) by the originating H.323 multimedia terminal (102). The originating multimedia terminal (102) assigns a TCP port to establish one end point of the first TCP connection between the originating multimedia terminal (102) and the corresponding multimedia server (110, 112 or 114) assigned to handle the call.

The establishment of the first TCP connection, or any TCP connection in the present invention, can be broken into a three step process: (a) sending of the SYN message by the originating multi-media terminal (102), (b) returning of the SYN+ACK message from the assigned multi-media server, and (c) the sending of the ACK message by the originating multi-media terminal (102). As stated previously, the first TCP connection allows for the exchange of H.225 messages.

As shown in FIG. 2, the first step in the three step process of establishing the first TCP connection requires the originating H.323 multimedia terminal (102) to transmit a SYN message to the NAT (106) requesting a particular service on a well known port (410). The SYN message is the synchronizing segment sent by TCP protocol, used to synchronize two ends of a connection in preparation for opening a connection. In this instance, it is the synchronization of the H.323 multimedia terminal (102) and the H.323 multi-media server (110, 112 or 114). In a preferred embodiment, the well-known port is port 1720, i.e. the well-known port for multi-media applications. The NAT (106) recognizes the identity of the well-known port and directs the H.323 multi-media call to the proper application.

Continuing with FIG. 2, the NAT (106) recognizes the message as a SYN message directed to a well-known port and therefore, as shown in the NAT translation rules in FIG. 5, chooses a multi-media server to terminate the TCP connection. As such, the NAT (106) essentially determines the multi-media server (110, 112 or 114) to process the call. The multi-media server has a second, different Internet protocol address. In a preferred embodiment, the determination of which server to use is performed by the NAT by round robin selection, but such a determination can be accomplished by any appropriate scheduling algorithm capable of determining the most efficient and cost effective multi-media server to process the call. The NAT (106) creates an association between the first internet protocol address and TCP port corresponding to the H.323 multi-media terminal (102) and the second, different internet protocol address identifying the H.323 multi-media server (110, 112 or 114) responsible for processing the call. Once the association has been made, the NAT (106) substitutes its own globally unique address for that of the multi-media server (110, 112 or 114) in the source IP address field and relays the SYN message (430) to the corresponding H.323 server (110, 112 or 114). The NAT (106) records the association for future use.

The corresponding H.323 multi-media server (110, 112 or 114) responds to the originating H.323 multi-media terminal (102) through the intermediate internet protocol address associated with NAT (106) with a SYN+ACK message (440). The NAT (106) relays the SYN+ACK message to the H.323 multi-media terminal (450).

The H.323 multi-media terminal (102) responds with an ACK message (460) to the NAT (106) based upon the well-known port. As shown in the NAT translation rule in the table of FIG. 5, The ACK message destined to the NAT (106) is mapped to the H.323 multi-media server (110, 112 or 114) based upon the NAT translation rule in FIG. 5. The first TCP connection is established. H.225 protocol messages are exchanged between the H.323 multi-media terminal (102) and the corresponding H.323 multi-media server (110, 112 or 114) over the first TCP connection.

H.323 multi-media terminal transmits a SETUP message (480) over the first TCP connection. The NAT (106) recognizes the message as destined for the well-port and not a SYN message and therefore, per the NAT translation rule illustrated in FIG. 5, maps the SETUP message from the first internet protocol address corresponding to the H.323 multi-media terminal (102) to the proper H.323 multi-media server handling the call (482). The mapping is accomplished due to the prior association made by the NAT in the prior SYN message. The SETUP message is relayed to the proper H.323 multi-media server.

During the exchange of H.225 protocol messages between the H.323 multi-media terminal (102) and the associated H.323 multi-media server (110, 112 or 114), a second TCP port is assigned uniquely identifying the second, different internet protocol address corresponding to the proper H.323 multi-media server responsible for processing the call (487). The second TCP port is carried back to the H.323 multimedia terminal (102) through the NAT (106) in a CONNECT message.

The assigning of the second TCP port uniquely identifying second, different Internet protocol address corresponding to the proper H.323 multi-media server handling the multi-media call is a very important step in the invention. The NAT (106) will associate the second TCP port with the H.323 multi-media server (110, 112 or 114) handling the call.

As shown in FIG. 6, the TCP port number is 16 bits in length, and is divided into two segments. The first seven bits (800) of the TCP port number identifies the server associated with the second, different Internet protocol address. However, any number of bits may be used for the first segment without departing from the intended scope of the invention.

In the preferred embodiment, the server associated with the second, different Internet protocol address is obtained by subtracting 48 from the decimal value of the first segment (i.e., the SERVER#+48 rule). Alternate embodiments would include subtracting any integer or constant value without departing from the scope of the invention. The server identifier constitutes the last octet of the Internet protocol address of the multi-media server (110, 112 or 114). The second segment of the TCP port number (810), which in the preferred embodiment is 9 bits in length, identifies the TCP connection in the same multi-media server.

This TCP port number is transmitted back to the first Internet protocol address identifying the H.323 multi-media terminal (102) in the user-to-user information element of the CONNECT message which is sent from the H.323 multi-media server (110, 112 or 114) to the NAT(106). True end-to-end destination information is the combination of the TCP port and internet protocol address. Since the multi-media service appears to be terminated at the NAT (106) at the multi-media terminal, the multi-media server (110, 112 or 114) returns the address of the NAT (106) in the user-to-user information block. This effects a consistent transmission path from the H.323 multi-media server (110, 112 or 114) to the NAT (106) or from the NAT (106) to a multi-media terminal (102) using the previously defined NAT translation rule in FIG. 5.

FIG. 3 illustrates the establishment of a second TCP connection between the H.323 multimedia terminal (102) and the H.323 multimedia server (110, 112 or 114) for the exchange of H.245 protocol messaging. As shown in step 500, the H.323 multimedia terminal (102) assigns a third TCP port corresponding to the H.323 multi-media terminal (102). A SYN message is sent from the H.323 multi-media terminal (102) to the H.323 multi-media server (110, 112 or 114). The SYN message is sent from the third TCP port and first internet address corresponding to the originating H.323 multi-media terminal (102) to the intermediate internet protocol address corresponding to the NAT (106) and the second TCP port corresponding to the H.323 multi-media server responsible for processing the call (505).

The NAT (106) receives the SYN message and recognizes the port is not a well-known port. As shown in the NAT translation rule in the table of FIG. 5, the NAT (106) translates the identity of the H.323 multi-media server responsible for processing the call by identifying the server number from translation of the first segment of the second TCP port (510) using the NAT translation rule from the table in FIG. 5. The second TCP port is carried in the SYN message as the destination TCP port number. The SERVER#+48 rule is applied because the destination port is not the well-known multi-media port.

As shown in step 515, after the NAT (106) translates the second port value into the H.323 multi-media server handling the multi-media call, the NAT (106) relays the SYN message to the H.323 multi-media server (110, 112 or 114). The corresponding H.323 server (110, 112 or 114) responds to the originating H.323 multi-media terminal through the intermediate internet protocol address associated with the NAT (106) with a SYN+ACK message (520). As shown in step 525, the NAT (106) relays the SYN+ACK message to the H.323 multi-media terminal (102).

The H.323 multi-media terminal (102) responds with an ACK message (530) which it sends to the NAT (106) destined for the second TCP port. As shown in the NAT translation rule in the table of FIG. 5, the NAT (106) recognizes that the destination port is not a well-known port and therefore determines the H.323 multi-media server (110, 112 and 114) responsible for processing //the multi-media call by performing the SERVER#+48 rule described previously (535). The ACK message is relayed to the proper H.323 multi-media server (110, 112 or 114) based upon the translation performed at the NAT (106). The second TCP connection is established. H.245 protocol messaging are exchanged between the H.323 multi-media terminal (102) and the corresponding H.323 multi-media server (110, 112 or 114) over the second TCP connection.

H.245 protocol messages exchanged between the H.323 multi-media terminal (102) and the corresponding H.323 multi-media server (110, 112 or 114) will include at least one TerminalCapabilitySet message. The TerminalCapabilitySet message informs the H.323 multi-media server (110, 112 or 114) of the capabilities of the H.323 multi-media terminal (102) and vice versa. The TerminalCapabilitySet message is sent from the H.323 multi-media terminal (102) to the NAT (106) designating the second TCP port as the destination. The NAT (106) recognizes that the destination TCP port is not a well-known port. Therefore, per the NAT translation rule from the table of FIG. 5, the NAT (106) calculates the server number corresponding to the H.323 multi-media server responsible for processing the long-lived connection using the SERVER#+48 rule described above (550). After the server number is determined, the NAT (106) relays the TerminalCapabilitySet message to the H.323 multi-media server (110, 112 or 114) responsible for processing the call (555).

As shown in FIG. 4, before the OpenLogicalChannel message is sent from the multi-media server (110, 112 or 114) to the multi-media terminal (102), a UDP port uniquely identifying 20 the second, different internet protocol address corresponding to the proper H.323 multi-media server handling the long-lived connection is assigned (600). As step 605 indicates, after the UDP port is assigned for the establishment of a UDP data path connection between the UDP port and the first Internet protocol address corresponding to the H.323 multi-media terminal (102), the OpenLogicalChannel message is sent from the H.323 multi-media server (110, 112 or 114) through the NAT (106) to the H.323 multi-media terminal (102). The OpenLogicalChannel message informs the H.323 multi-media terminal (102) of the UDP port to be used for the UDP data path (610).

Upon receipt of the OpenLogicalChannel message, the H.323 multi-media terminal (102) responds with an OpenLogicalChannelAck. The OpenLogicalChannelAck is sent to the intermediate Internet protocol address identifying the NAT (106) designating the second TCP port as the destination. As shown in the NAT translation rule in the table of FIG. 5, the NAT (106) recognizes that the destination port is not a well-known port and therefore determines the H.323 multi-media server responsible for processing the long-lived connection by the SERVER#+48 rule described previously (620). As shown in step 625, the OpenLogicalChannelAck message is relayed to the proper H.323 multi-media server (110, 112 or 114) based upon the translation performed at the NAT (106). The UDP data path is established.

User data is exchanged between the H.323 multi-media terminal (102) and the H.323 multimedia server (110, 112 or 114) through an intermediary such as the NAT (106) once the UDP data path is established. In step 630, user data is sent from the first Internet protocol address to the intermediate Internet protocol address corresponding to the NAT (106) designating as the destination the UDP port corresponding to the H.323 multi-media server (110, 112 or 114) responsible for the call. As shown in the NAT translation rule in the table of FIG. 5, the NAT (106) recognizes that the destination port is not a well-known port and therefore determines the H.323 multi-media server (110, 112 or 114) responsible for processing the long-lived connection by translating the server number from the value of the first segment of the UDP port (635). The method of translating is the same as the SERVER#+48 rule described above. After the server number is determined, the user data is relayed to the H.323 multimedia server (110, 112 or 114) responsible for processing the call (640). As shown in steps 645 and 650, the H.323 multimedia server (110, 112 or 114) sends user data to the NAT (106) which relays the user data to the H.323 multi-media terminal (102).

Using the invention described herein, delivery of Internet protocol datagrams belonging to the same call, including control signal and data transmission, will be routed to the same H.323 multimedia server for the duration of the multi-media call. The need for a H.323 proxy is eliminated thereby freeing up valuable resources for other tasks. The invention utilizes a Network Address Translator (NAT) for creating an association between a port address and the corresponding H.323 multi-media server responsible for handling the call. Once the association is created, the NAT can calculate the proper server number from the port value thereby routing the datagrams belonging to the same call to the same H.323 multi-media server.

The invention has been described with reference to the preferred embodiment. Obviously, modifications and alterations will occur to others upon reading and understanding of this specification. It is intended to include all such modifications and alterations insofar as they come within the scope of the appended claims or the equivalents thereof.

We claim:

1. A method of establishing a multi-media call between a first peer identified by a first Internet protocol address and a second peer identified by a second, different Internet protocol address through an intermediate Internet protocol address, comprising the steps of:
   establishing a first control connection between the first Internet protocol address and the second, different Internet protocol address through the intermediate Internet protocol address;
   establishing a second control connection between the first Internet protocol address and the second, different Internet protocol address through the intermediate Internet protocol address using an associating device;
   establishing a data path between the first Internet protocol address and the second, different Internet protocol address through the intermediate Internet protocol address using the associating device;
   transmitting data via the data path; and
   maintaining, during the duration of the call, the connection between the first Internet protocol address and the second Internet protocol address.

2. The method of claim 1, wherein the step of establishing a first control connection includes establishing a first TCP connection.

3. The method of claim 1, wherein the step of establishing a second control connection includes establishing a second TCP connection.

4. The method of claim 1, wherein the step of establishing a data path includes establishing a UDP data path.

5. The method of claim 1, wherein the step of establishing a first connection further comprises the step of assigning, at the intermediate protocol address, a multimedia server corresponding to the second, different Internet protocol address.

6. The method of claim 1, wherein the step of establishing a first control connection further comprises establishing a first TCP connection based upon a first TCP port associated with the first Internet protocol address and a well known port associated with the second, different Internet protocol address.

7. The method of claim 1, further comprising using the first control connection to perform the steps of:
   assigning a TCP port uniquely identifying the second, different Internet protocol address;
   creating an association at the application defined by the intermediate Internet protocol address, associating the second, different Internet protocol address with the TCP port uniquely identifying the second, different Internet protocol address.

8. The method of claim 7, wherein the step of establishing a second control connection further comprises the step of establishing a TCP connection between a second port associated with the first Internet protocol address and the TCP port uniquely identifying the second, different Internet protocol address, via the association created at the intermediate protocol address.

9. The method of claim 1, further comprising using the second control connection to perform the steps of:
   assigning a UDP port uniquely identifying the second, different Internet protocol address;
   creating an association at the application defined by the intermediate Internet protocol address, associating the second, different Internet protocol address with the UDP port uniquely identifying the second, different Internet protocol address.

10. The method of claim 9, wherein said step of establishing data path further comprises establishing a UDP data path between a first UDP port associated with the first Internet protocol address and the UDP port uniquely identifying the second, different Internet protocol address, via the association created at the intermediate Internet protocol address.

11. The method of claim 2, further comprising the step of sending UDP data packets between the multimedia service client and the multimedia server through the intermediary.

12. A method of establishing a multi-media call between a first Internet protocol address identifying a multimedia service client and a second, different Internet protocol address identifying a multimedia server through an intermediate Internet protocol address identifying an intermediary, comprising the steps of:
   a) at the intermediate Internet protocol address, assigning the multimedia server having the second, different Internet protocol address to process the multimedia call;
   b) establishing a first TCP connection between the multimedia service client and the multimedia server through the intermediary;
   c) establishing a second TCP connection between the multimedia service client and the multimedia server through the intermediary;
   d) establishing a UDP data path between the multimedia service client and the multimedia server through the intermediary; and e) maintaining, for the duration of the call, the connection between the first Internet protocol address and the second Internet protocol address.

13. The method of claim 12, wherein step b) further comprises establishing a first TCP connection between the multimedia service client TCP port associated with the first Internet protocol address and the well known port associated with the second, different Internet protocol address corresponding to the multimedia server.

14. The method of claim 12, wherein step b) further comprises the steps of:
assigning the multi-media server to handle the call; and
associating, at the intermediary, a multimedia service client TCP port associated with the first Internet protocol address with the server having the second, different Internet protocol.

15. The method of claim 12, further comprising the step of assigning a TCP port uniquely identifying the multi-media server, said step occurring between steps b) and c).

16. The method of claim 15, further comprising the step of calculating, at the intermediary, the identity of the server from the TCP port uniquely identifying the multi-media server.

17. The method of claim 12, further comprising the step of assigning a UDP port uniquely identifying the multi-media server, said step occurring between the occurrence of steps c) and d).

18. The method of claim 17, further comprising the step of calculating, at the intermediary, the identity of the server from the UDP port uniquely identifying the server.

19. The method of claim 17, wherein step d) further comprises establishing a connectionless UDP data path between the first UDP port associated with the first Internet protocol address identifying the multimedia service client and the UDP port associated with the second, different Internet protocol address identifying the multimedia server.

20. A method of establishing a multi-media call between a first Internet protocol address identifying a multimedia service terminal and a second, different Internet protocol address identifying a multimedia server through an intermediate Internet protocol address identifying a Network Address Translator (NAT), comprising the steps of:
a) assigning a first TCP port at a multi-media service terminal;
b) at the intermediate Internet protocol address, assigning a multimedia server having the associated second, different Internet protocol address to process the multi-media call;
c) establishing a first TCP connection between the first Internet protocol address using the first TCP port and the second, different Internet protocol address using a well known port, through the intermediate Internet protocol address;
d) assigning a second TCP port at the second, different Internet protocol address uniquely identifying the multimedia server;
e) exchanging control signals using the first TCP connection;
f) assigning a third TCP port at the multi-media terminal;
g) establishing a second TCP connection, through the intermediate Internet protocol address, between the first Internet protocol address using the third TCP port and the second, different Internet protocol address using the second TCP port;
h) assigning a UDP port at the second Internet protocol address associated with and uniquely identifying the multimedia server,
i) exchanging control signals using the second TCP connection
j) establishing a data path through the intermediary, between the multimedia service client using a first UDP port and the multimedia server using the UDP port identifying the multimedia server.

21. The method of claim 20, wherein step e) further comprises the step of associating the first Internet protocol address with the second, different Internet protocol address at the intermediate Internet protocol address.

22. The method of claim 20, wherein step i) further comprises the step of associating the first Internet protocol address and the second, different Internet protocol address at the intermediate Internet protocol address.

23. The method of claim 20, wherein step e) further comprises the step of sending and receiving H.225 messages over the first TCP connection.

24. The method of claim 20, wherein step i) further comprises the step of sending and receiving H.245 messages over the second TCP connection.

25. The method of claim 20 wherein step b) further comprises the step of assigning the multi-media server having the associated second, different Internet protocol address by a scheduling algorithm.

26. The method of claim 20 wherein step b) further comprises the step of assigning the multi-media server having the associated second, different Internet protocol address by round robin.

27. A method of establishing a multi-media call between an H.323 multi-media service terminal having a first Internet Protocol (IP) address and an H.323 multi-media server having a second IP address through a network address translator (NAT) having a third IP address, comprising the steps of:
a) establishing a first TCP connection between the H.323 multi-media service terminal and the H.323 multi-media server by:
i) assigning a first TCP port associated with the H.323 multi-media service terminal;
ii) sending a SYN message from the H.323 multi-media service terminal to the NAT requesting a service on a well known port, the NAT performing the steps of:
A) assigning the H.323 multi-media server to process the call;
B) associating the first IP address and the first TCP port with the second IP address;
C) changing the destination IP address from the intermediate IP address to the second IP address;
D) relaying the SYN message from the NAT to the H.323 multi-media server using the association created in (a)(ii)(B);
iii) sending a SYN+ACK message from the H.323 multi-media server to the NAT which translates the source IP address to its own globally unique IP address and relays the SYN+ACK message to the H.323 service terminal;
iv) sending an ACK message from the H.323 multi-media service terminal to the NAT, the NAT performing the steps of:
A) determining the identity of the H.323 multi-media server using the association made in (a)(ii)(B);
B) changing the destination IP address from the intermediate IP address to the second IP address;
C) relaying the ACK message from the NAT to the H.323 multi-media server using the determination made in (a)(iv)(A);
b) sending a SETUP message from the H.323 multi-media service terminal through the NAT to the H.323 multi-media server over the first TCP connection;

c) at the H.323 server, assigning a second TCP port uniquely identifying the H.323 multi-media server;

d) sending a CONNECT message containing the identity of the second TCP port from the H.323 multi-media server to the H.323 multi-media service terminal over the first TCP connection;

e) establishing a second TCP connection between the H.323 multi-media service terminal and the H.323 multi-media server by:
  i) at the H.323 multi-media service terminal, assigning a third TCP port associated with the H.323 multi-media service terminal;
  ii) sending a SYN message from the H.323 multi-media service terminal through the NAT to the second TCP port, the NAT performing the steps of:
    A) determining the identity of the H.323 multi-media server using a calculation rule;
    B) relaying the SYN message from the NAT to the H.323 multi-media server using the determination made in (e)(ii)(B);
  iii) sending a SYN+ACK message from the H.323 multi-media server to the NAT which translates the source IP address to its own globally unique Internet protocol address and relays the SYN+ACK message to the H.323 service terminal;
  iv) sending an ACK message from the H.323 multi-media service terminal through the NAT to the H.323 multi-media server, the NAT performing the steps of:
    A) determining the identity of the H.323 multi-media server using a calculation rule;
    B) relaying the SYN message from the NAT to the H.323 multi-media server using the determination made in (e)(iv)(B);

f) assigning a UDP port uniquely identifying the H.323 multimedia server;

g) sending messages over the second TCP connection containing the end point characteristics and the identity of the UDP port uniquely identifying the H.323 multi-media server;

h) establishing a UDP data path between the H.323 multi-media service terminal and the H.323 multi-media server by:
  i) sending an OpenLogicalChannel message from the H.323 multi-media server through the NAT to the H.323 multi-media service terminal to establish the UDP data path;
  ii) sending an OpenLogicalChannelAck message from the H.323 multi-media service terminal through the NAT to the H.323 multi-media server to acknowledge the establishment of the UDP data path;

i) sending data via the UDP data path.

28. The method of claim 27, wherein the step of assigning a second TCP port uniquely identifying the H.323 multi-media server further comprises identifying the H.323 multi-media server by the SERVER#+48 rule.

29. The method of claim 27, wherein the step of assigning a UDP port uniquely identifying the H.323 multi-media server further comprises identifying the H.323 multi-media server by the SERVER#+48 rule.

30. The method of claim 27, wherein the step of assigning a UDP port uniquely identifying the H.323 multi-media server further comprises identifying the H.323 multi-media server by the SERVER#+ a constant.

31. A method for establishing a multimedia call between a public network and a private network through an address proxy comprising the steps of:

a) at the address proxy, associating an Internet Protocol (IP) address and a TCP port of a multimedia terminal connected to the public network with an IP address of a server connected to the private network;

b) at the server, assigning a TCP port uniquely identifying the multimedia server handling the multimedia call;

c) at the address proxy, calculating the identity of the multimedia server from the value of the TCP port uniquely identifying the multimedia server handling the multimedia call.

32. The method of claim 31, further comprising the step performed between steps a) and b) of changing the IP address of the address proxy to that of the multimedia server.

33. The method of claim 31, wherein the step of assigning a TCP port uniquely identifying the multimedia server handling the multimedia call further comprises the step of assigning a UDP port uniquely identifying the multimedia server handling the multimedia call.

34. The method of claim 31, wherein step c) further comprises the step of performing the SERVER#+48 rule at the address proxy.

35. A method for establishing a multimedia call between a public network and a private network comprising a plurality of H.323 multi-media servers through a Network Address Translator (NAT), the method comprising the steps of:

a) at the NAT, associating an Internet Protocol (IP) address and a Transmission Control Protocol (TCP) port of a multimedia terminal connected to the public network with an IP address of one of the plurality of H.323 multi-media servers, the one of the plurality of H.323 multi-media servers being responsible for the multimedia call;

b) at the one of the plurality of H.323 multi-media servers, assigning a TCP port uniquely identifying the one of the plurality of H.323 multi-media servers;

c) at the NAT, calculating the identity of the one of the plurality of H.323 multi-media servers from a value of the TCP port uniquely identifying the one of the plurality of H.323 multi-media servers;

d) the NAT requesting a service on a well known port;

e) the multimedia terminal sending a SYN message to the NAT;

f) the NAT performing the steps of:
  i) assigning the one of the plurality of H.323 multi-media servers to process the multimedia call;
  ii) changing a destination IP address from an intermediate IP address to the IP address of the one of the plurality of H.323 multi-media servers;
  iii) relaying the SYN message from the NAT to the one of the plurality of H.323 multi-media servers using the association created in (a);

g) sending a SYN+ACK message from the one of the plurality of H.323 multi-media servers to the NAT which translates a source IP address to its own globally unique IP address and relays the SYN+ACK message to the multimedia terminal.

36. The method of claim 35, wherein the step (f)(ii) comprises the step performed between steps a) and b) of changing the IP address of the NAT to that of the one of the plurality of H.323 multi-media servers.

37. The method of claim 35, wherein step b) further comprises the step of assigning a UDP port uniquely identifying the one of the plurality of multi-media servers.

38. The method of claim 35, wherein step c) further comprises the step of performing the SERVER#+48 rule at the NAT.

39. An apparatus for establishing a multi-media call between an H.323 terminal having a first Internet protocol address and one of many H.323 servers having a second Internet protocol address though a network address translator (NAT) having a third Internet protocol address, the apparatus comprising:

an H.323 multi-media service terminal associated with the second, different Internet protocol address;

an H.323 multimedia server associated with the second, different Internet protocol address;

a network address translator (NAT) associated with an intermediate Internet protocol address, said network address translator operatively coupled to said H.323 multi-media service terminal and to said H.323 multimedia server;

the network address translator requesting service on a well known port;

the H.323 multi-media service terminal sending a SYN message to the network address translator;

said network address translator:

assigning the H.323 multimedia server to process the call;

associating a TCP port with the H.323 multimedia server;

associating a UDP port with the H.323 multimedia server;

associating the first Internet protocol address and the TCP port with the second Internet protocol address;

changing a destination Internet protocol address from the intermediate Internet protocol address to the second Internet protocol address;

relaying the SYN message from the network address translator to the H.323 multimedia server using the association created in the step of associating the first Internet protocol address and the TCP port with the second Internet protocol address;

the H.323 multimedia server sending a SYN+ACK message to the network address translator which translates a source Internet protocol address to its own globally unique Internet protocol address and relays the SYN+ACK message to the H.323 multi-media service terminal.

40. A Network Address Translator (NAT), interfaced with a network connected to an H.323 multimedia terminal having a first Internet Protocol (IP) address and a private network connected to one of a plurality of H.323 multimedia servers having a second IP address, for allowing a one-to-many distribution;

said NAT calculating an identity of an H.323 multimedia server of the plurality of H.323 multimedia servers in the private network;

the NAT associating an IP address and a Transmission Control Protocol (TCP) port identifying the H.323 multimedia terminal with an IP address identifying the H.323 multimedia server;

the NAT assigning the H.323 multimedia server to process a call;

the NAT requesting service on a well known port;

the H.323 multimedia terminal sending a SYN message to the NAT;

the NAT changing a destination Internet protocol address from an intermediate Internet protocol address to the IP address identifying the H.323 multimedia server;

the H.323 multimedia server sending a SYN+ACK message to the NAT which translates a source Internet protocol address to its own globally unique Internet protocol address and relays the SYN+ACK message to the H.323 multimedia terminal.

41. The apparatus of claim 40, wherein said network address translator is a computer which calculates the identity of the multi-media server in the private network.

42. The apparatus of claim 40, wherein said NAT comprises a computer readable medium having stored thereon data structure, comprising a first data storage element stored in a first region of a range of memory addresses in the medium.

* * * * *